United States Patent
Attard et al.

(10) Patent No.: US 9,212,926 B2
(45) Date of Patent: Dec. 15, 2015

(54) IN-VEHICLE PATH VERIFICATION

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); John P. Joyce, West Bloomfield, MI (US); Devinder Singh Kochhar, Ann Arbor, MI (US); Thomas Edward Pilutti, Ann Arbor, MI (US); Douglas Scott Rhode, Farmington Hills, MI (US); Matt Y. Rupp, Canton, MI (US); John Shutko, Ann Arbor, MI (US); Roger Arnold Trombley, Ann Arbor, MI (US); Louis Tijerina, Dearborn, MI (US); Hongtei Eric Tseng, Canton, MI (US); Andrew Waldis, Orion Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/088,203

(22) Filed: Nov. 22, 2013

(65) Prior Publication Data

US 2015/0149088 A1    May 28, 2015

(51) Int. Cl.
*G01C 21/36*     (2006.01)
*G08G 1/16*      (2006.01)
*B60W 30/08*     (2012.01)
*G05D 1/02*      (2006.01)
*B60Q 1/52*      (2006.01)

(52) U.S. Cl.
CPC ............... *G01C 21/36* (2013.01); *B60W 30/08* (2013.01); *G05D 1/021* (2013.01); *G08G 1/16* (2013.01); *B60Q 1/525* (2013.01)

(58) Field of Classification Search
CPC ........... G08G 1/16; G08G 1/167; B60Q 1/525
USPC .................................. 701/301; 340/435, 436
See application file for complete search history.

(56) References Cited

U.S. PATENT DOCUMENTS

| | | | |
|---|---|---|---|
| 7,034,668 | B2 | 4/2006 | Engelman et al. |
| 8,126,642 | B2 | 2/2012 | Trepagnier et al. |
| 8,380,425 | B2 | 2/2013 | Duggan et al. |

(Continued)

OTHER PUBLICATIONS

Erik Coelingh et al., "Collision Warning With Auto Brake—A Real-Life Safety Perspective", Volvo Car Corporation, Sweden, Paper No. 07-0450, 9 pages.

(Continued)

*Primary Examiner* — Thomas G Black
*Assistant Examiner* — Peter D Nolan
(74) *Attorney, Agent, or Firm* — Frank A. MacKenzie; Bejin Bieneman PLC

(57) ABSTRACT

A vehicle is operated at least partially autonomously. A predicted path of the vehicle is monitored to identify an object with which the vehicle is likely to collide. A graphical user interface (GUI) is provided that includes the predicted path, a proposed path for the vehicle to avoid a collision with an object, and the vehicle. A selection is made to follow one of the predicted path and the proposed path. The GUI is updated to include the selected one of the predicted path and the proposed path, along with a location of the vehicle on the selected one of the predicted path and the proposed path.

20 Claims, 6 Drawing Sheets

(56) References Cited

U.S. PATENT DOCUMENTS

| | | | |
|---|---|---|---|
| 8,392,065 B2 | 3/2013 | Tolstedt et al. | |
| 8,738,213 B1* | 5/2014 | Szybalski et al. | 701/28 |
| 8,849,515 B2* | 9/2014 | Moshchuk et al. | 701/42 |
| 2008/0065293 A1* | 3/2008 | Placke et al. | 701/41 |
| 2010/0052883 A1* | 3/2010 | Person | 340/435 |
| 2010/0253543 A1* | 10/2010 | Szczerba et al. | 340/932.2 |
| 2010/0253602 A1* | 10/2010 | Szczerba et al. | 345/8 |
| 2010/0292886 A1* | 11/2010 | Szczerba et al. | 701/29 |
| 2011/0087433 A1* | 4/2011 | Yester | 701/301 |
| 2011/0260846 A1* | 10/2011 | Mochizuki et al. | 340/435 |
| 2012/0239265 A1* | 9/2012 | Kato et al. | 701/70 |
| 2012/0296561 A1* | 11/2012 | Park et al. | 701/119 |
| 2012/0330541 A1* | 12/2012 | Sakugawa et al. | 701/301 |
| 2013/0030651 A1* | 1/2013 | Moshchuk et al. | 701/41 |
| 2013/0054089 A1* | 2/2013 | Nordbruch et al. | 701/36 |
| 2013/0124020 A1 | 5/2013 | Duggan et al. | |
| 2013/0173159 A1* | 7/2013 | Trum et al. | 701/533 |
| 2013/0211656 A1 | 8/2013 | An et al. | |
| 2013/0218396 A1* | 8/2013 | Moshchuk et al. | 701/25 |
| 2013/0226407 A1* | 8/2013 | Rentschler et al. | 701/41 |
| 2014/0207325 A1* | 7/2014 | Mudalige et al. | 701/26 |

OTHER PUBLICATIONS

Tom Schouwenaars et al., "Safe Receding Horizon Path Planning for Autonomous Vehicles", Laboratory for Information and Decision Systems, Space Systems Laboratory, MIT, Cambridge MA, 10 pages.

* cited by examiner

IN-VEHICLE PATH VERIFICATION

BACKGROUND

An autonomous vehicle, e.g., an automobile, bus, truck, watercraft, etc., may include a computing device executing instructions for operating the vehicle either wholly or partially autonomously, i.e., without input, or with partial input, from a human operator. For example, the vehicle computing device may receive data from one or more sensors, and then process sensor data to provide input to the computing device for determining autonomous operations of the vehicle, e.g., to control navigation, speed, braking, etc. However, it may be undesirable and/or impossible for a vehicle computing device to make all decisions concerning autonomous vehicle operations. For example, an autonomous vehicle may determine that one or more objects lie in a planned path of the autonomous vehicle; upon such a determination it may or may not be desirable to rely on a vehicle computer to alter a vehicle path to avoid an object. Further, human-machine interfaces (HMI) are lacking, e.g., to display and provide for verification of a vehicle path.

DRAWINGS

FIGS. 3-6 provide respective examples of block diagrams of a graphical user interface that could be provided by a vehicle computer.

DESCRIPTION

Introduction

Figure 1:
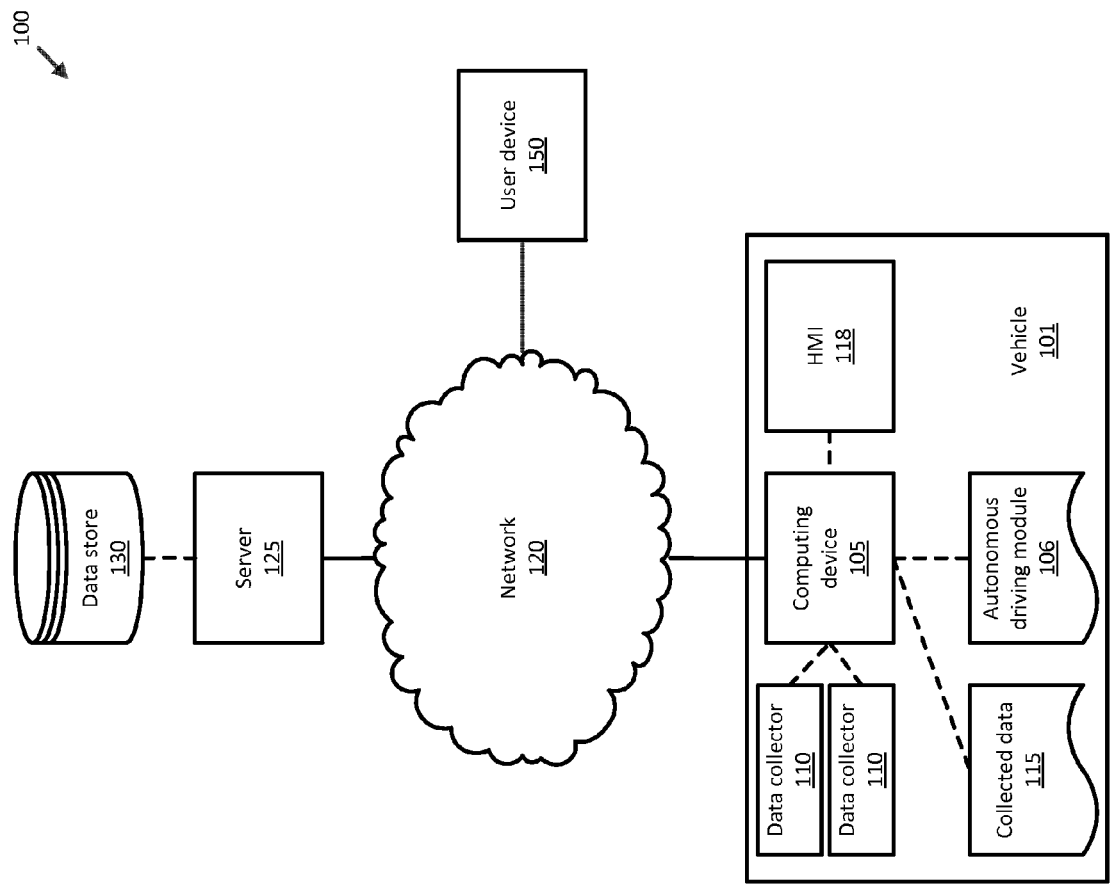
FIG. 1 is a block diagram of an exemplary vehicle system for operating an autonomous vehicle.

FIG. 1 is a block diagram of an exemplary vehicle system for operating an autonomous vehicle 101. The vehicle 101 generally includes a computing device 105 that obtains collected data 115 from one or more data collectors, e.g., sensors, 110. The collected data 115 may be used to identify one or more objects such as other stationary and/or moving vehicles, construction barriers, debris, etc., that may be in a predicted path of the vehicle 101 and/or pose a threat to vehicle 101 navigation or operation. Via a human machine interface (HMI) 118, e.g., a graphical user interface (GUI) or the like, the computer 105 may provide a vehicle 101 occupant with information concerning one or more identified objects relative to a predicted path of the vehicle 101. Further, the computer 105 may accept input from a vehicle 101 occupant, e.g., a vehicle 101 driver, via the HMI 118, concerning action to be taken regarding one or more identified objects relative to the vehicle 101 predicted path.

Exemplary System Elements

The system 100 includes one or more vehicles 101, a single vehicle 101 being shown for ease of illustration. As mentioned above, a vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select and carry out an autonomous operation mode of the vehicle 101, e.g., as described herein with respect to the module 106.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

As mentioned above, generally included in instructions stored in and executed by the computer 105 is an autonomous driving module 106; alternatively or additionally, the vehicle 101 could include one or more other computing devices storing and executing the module 106. Using data received in the computer 105, e.g., from data collectors 110, data included as stored parameters 116, the server 125, etc., the module 106 may control various vehicle 101 components and/or operations without a driver input to operate the vehicle 101. For example, the module 106 may be used to regulate vehicle 101 speed, acceleration, deceleration, steering, etc.

Data collectors 110 may include a variety of devices such as sensors and the like for collecting data 115. For example, various controllers in a vehicle may operate as data collectors 110 to provide collected data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LADAR, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc.

A memory of the computer 105 generally stores collected data 115. As mentioned above, collected data 115 may include a variety of data collected in a vehicle 101 from data collectors 110 and/or data calculated therefrom in the computer 105.

In general, collected data 115 may include any data that may be gathered by a collection device 110 and/or computed from such data. Accordingly, collected data 115 could include a variety of data related to vehicle 101 operations and/or performance, as well as data related to in particular relating to motion of the vehicle 101. For example, collected data 115 could include data 115 concerning a vehicle 101 speed, steering wheel torque, e.g., as may be obtained via a vehicle 101 CAN bus from an electronic power assist steering (EPAS) system or the like, acceleration, braking, lane changes and or lane usage (e.g., on particular roads and/or types of roads such as interstate highways), average distances from other vehicles at respective speeds or ranges of speeds, and/or other data 115 relating to a vehicle 101 operation.

HMI 118 could be one or more of a variety of interfaces for the computer 105 to interact with a vehicle 101 occupant, e.g., a GUI as mentioned above, an interactive voice response (IVR) system, a heads up display (HUD) or the like provided in or near a vehicle 101 dashboard, an interface of a user device 150, etc. Further, HMI 118 could be provided by any one of a number of computing devices that may be worn by or attached to a user, e.g., a wearable device that could be in the form of glasses, goggles, a wristband, etc. Further, a wearable device providing an HMI 118 is generally configured for communication with the computer 105 via known wired or wireless mechanisms, e.g., the Bluetooth protocol, IEEE 802.11, or the like. The wearable device 118 may include a variety of user interface mechanisms, including a graphical display provided on optical see-through (OST) glasses, augmented reality goggles, a wrist device, etc., audio mechanisms, haptic mechanisms, e.g., that vibrate against a user's body, etc.

FIGS. 3-6 provide examples of a GUI 300 that could be provided by the computer 105 via the HMI 118. As seen in the various FIGS. 3-6, each of which is discussed in more detail below, the GUI 300 provides a representation of the vehicle 101, along with moving objects 305 and a stationary object 310, with respect to a road 315. The GUI 300 also includes a dialog box 320 whereby a vehicle 101 occupant may provide input with respect to information provided in the GUI 300. For example, the computer 105 includes instructions to identify a predicted path of the vehicle 101 based on collected data 115, e.g., speed, acceleration, deceleration, steering wheel torque, etc.

Figure 3:
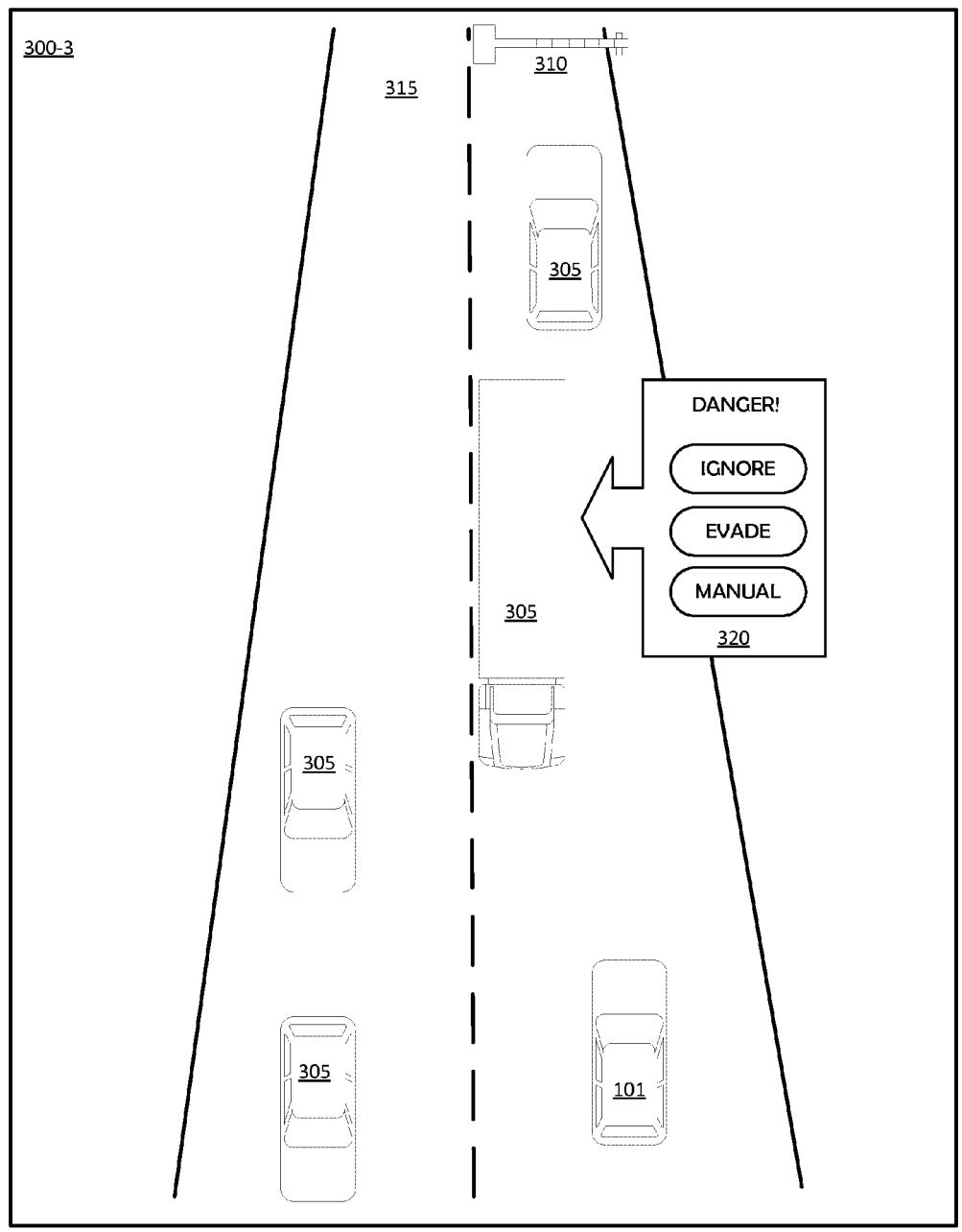

Further, the computer 105 includes instructions to identify locations of objects 305, 310, as well as predicted paths of moving objects 305. Accordingly, the computer 105 may determine when a collision, or possibility of a collision, between the vehicle 101 and one or more objects 305, 310, may be predicted, e.g., an object may be detected in a vehicle 101 path at or above a pre-determined level of confidence. Mechanisms for detecting possible collisions, assessing collision threats and risks, etc., are known. As just one example, such mechanisms are described in U.S. Pat. No. 7,034,668, entitled "Threat level identification and quantifying system," the contents of which are fully incorporated herein by reference in their entirety. Upon such determination, an alert and/or dialog box 320 may be provided. For example, as seen in FIG. 3, the dialog box 320 may indicate, with respect to a moving object 305, a danger condition with respect to the vehicle 101. Further, the dialog box 320 may give a vehicle 101 occupant options to ignore the danger, to instruct the autonomous module 106 to evade the danger (which may be a default option), or an option to assume manual control of the autonomous vehicle 101. Depending on threat level and urgency, the HMI may instead indicate the automated vehicle's 101 planned escape path and provide a mechanism for the driver to cancel or alter an automated evasive maneuver, rather than approve it.

Figure 4:
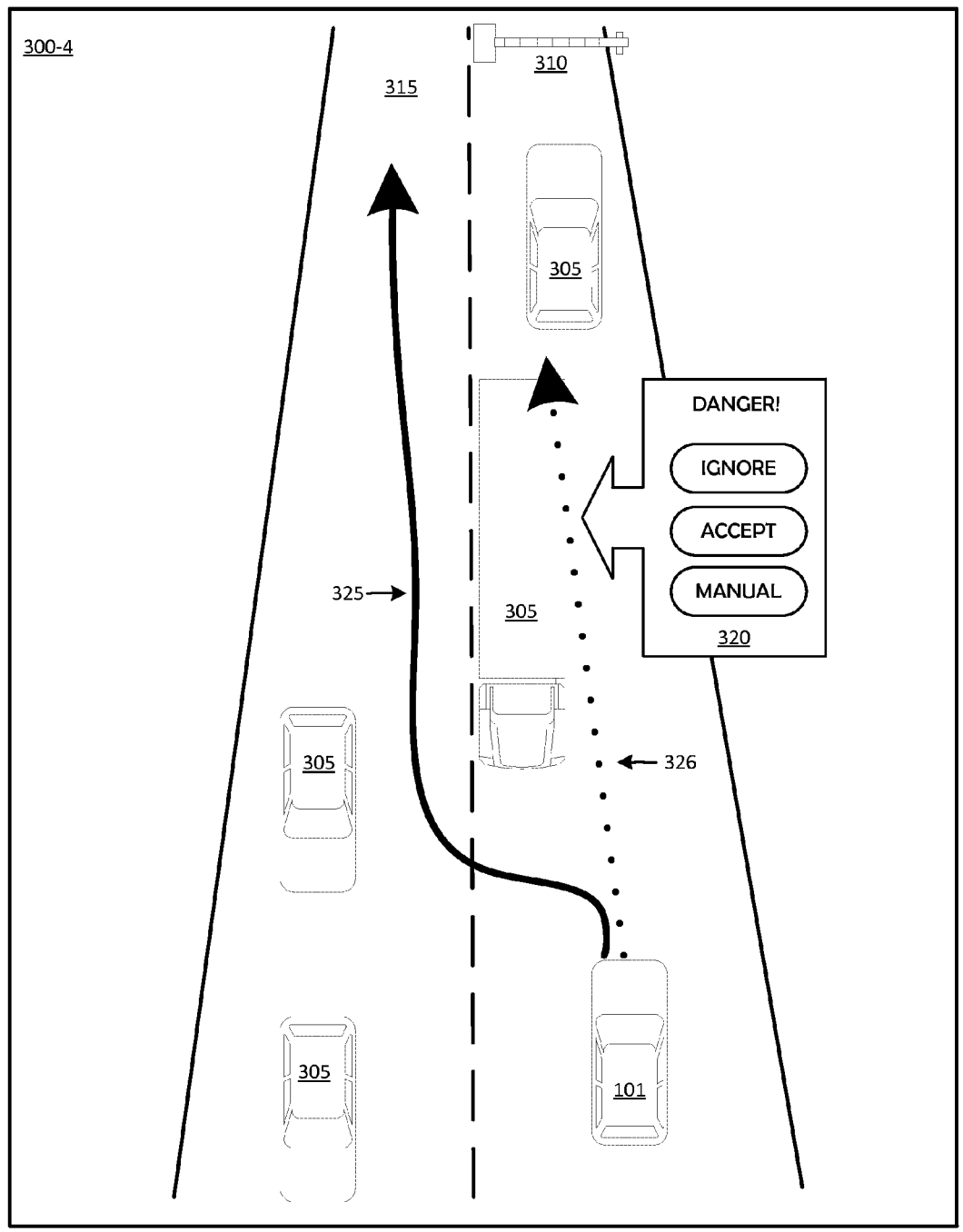

FIG. 4 provides an example of the GUI 300 including a representation of a predicted path 325 of the vehicle 101. Accordingly, the dialog box 320 may allow a user to ignore a danger with respect to an object 305, assume manual control of the autonomous vehicle 101, or to accept the proposed predicted path 325 of the vehicle 101 to avoid the moving object 305 presenting a danger.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, one or more parameters 116 for a particular user could be stored in the server 125 and retrieved by the computer 105 when the user was in a particular vehicle 101. Likewise, the server 125 could, as mentioned above, provide data to the computer 105 for use in determining parameters 116, e.g., data concerning weather conditions, road conditions, construction zones, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, via known protocols such as Bluetooth, etc. Accordingly, a user device 150 may be used to carry out certain operations herein ascribed to a data collector 110, e.g., voice recognition functions, cameras, global positioning system (GPS) functions, etc., and a user device 150 could be used to provide data 115 to the computer 105. Further, a user device 150 could be used to provide a human machine interface (HMI) to the computer 105.

Exemplary HMI Displays

Figure 2:
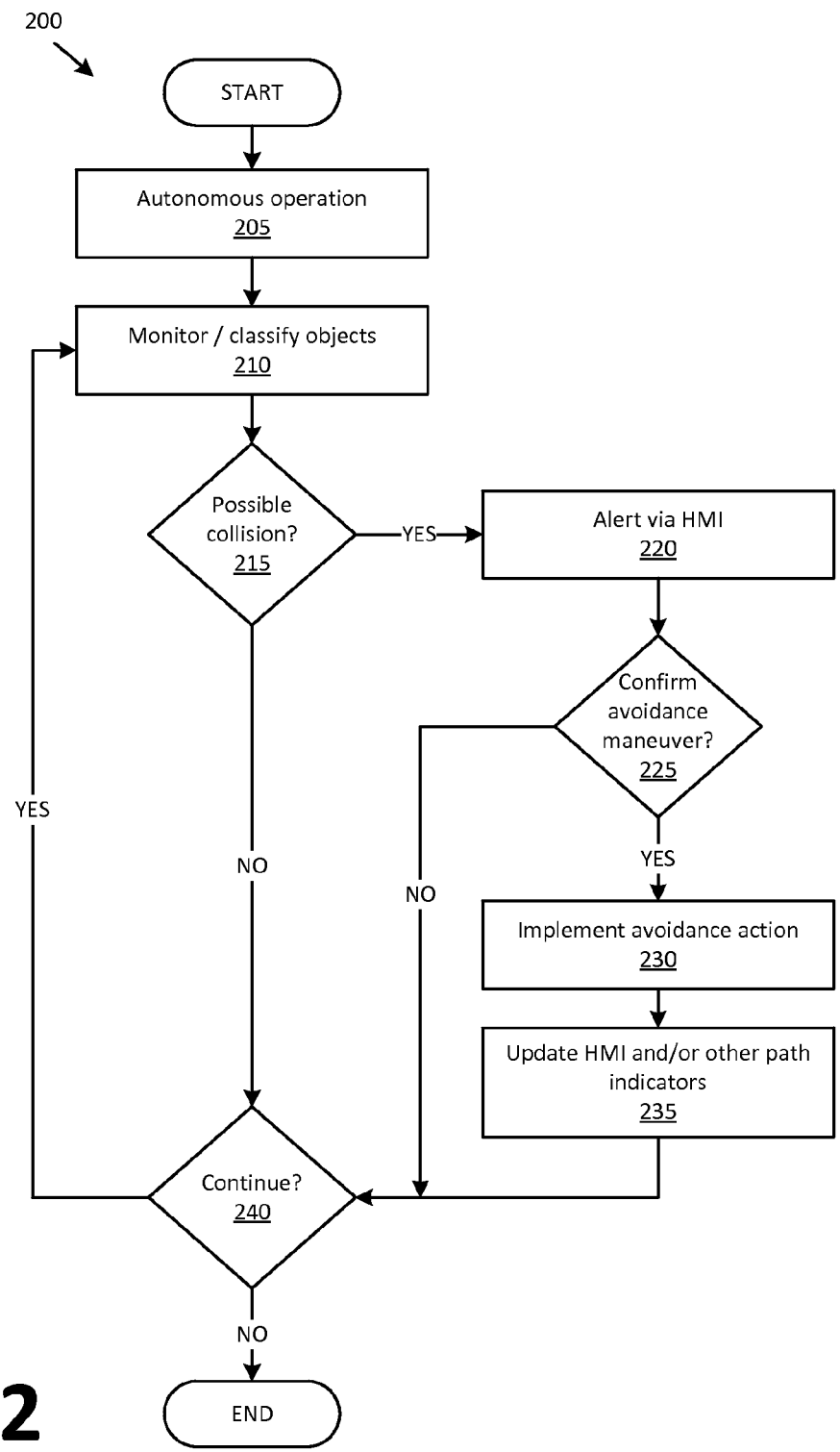
FIG. 2 is a diagram of an exemplary process for a computer in an autonomous vehicle to communicate with one or more vehicle occupants concerning a possible future path of the vehicle.

FIG. 2 is a diagram of an exemplary process 200, described in detail below, for a computer 105 in an autonomous vehicle 101 to communicate with one or more vehicle occupants concerning a possible future path of the vehicle 101. The process 200 is described herein with respect to FIGS. 3-6, which provide respective examples of block diagrams of a graphical user interface 300 that could be provided by a vehicle computer 105 via and HMI 118. Prior to providing a detailed description of the process 200, therefore, it will be helpful to describe the different states of the GUI 300 in each of FIGS. 3-6, and how they relate to one another. References herein to the GUI 300 generically refer to each of the GUIs 300-3, 300-4, 300-5, and 300-6 shown respectively in FIGS. 3, 4, 5, and 6; each of the FIGS. 3-6 shows an example of the display in a GUI 300.

FIG. 3 illustrates a GUI 300-3 in the HMI 118 providing a graphical alert in the form of a dialog box 320 of an object 305 presenting a possible danger to a vehicle 101. For example, the vehicle 101 could be shown in a present state of travel on a road 315, along with moving objects 305 and/or stationary objects 310 also on or near the road 315. As mentioned above, a dialog box 320 and/or some other HMI mechanism, e.g., an audible alert, etc., could be provided to alert a vehicle 101 occupant concerning an object 305 presenting a possible danger to the vehicle 101. The HMI, e.g., in the dialog box 320, could provide a vehicle 101 occupant with various options with respect to the object 305 of interest, e.g., to ignore the alert or warning and proceed on a previously-planned path, to take action to evade the object 305 (which could be a default option), or an option to resume manual control of the autonomous vehicle 101.

FIG. 4 illustrates a GUI 300-4 in the HMI 118 with additional details not provided in the GUI 300-3 of FIG. 3. FIG. 4 illustrates the GUI 300 providing a graphical alert in the form of a dialog box 320 of an object 305 presenting a possible danger relative to a predicted travel path 326 of a vehicle 101. Accordingly, a vehicle 101 occupant could look at the GUI 300-4 to see that a projected or predicted path 326 will result in a collision with a moving object 305, whereas a proposed path 325 could be executed by the module 106 to avoid a collision with the moving object 305. For example, a projected path of 325 of a vehicle 101 may be determined via a variety of known mechanisms, e.g., combining vehicle speed, acceleration, deceleration, etc. data with global positioning system (GPS) or other navigational data to determine a likely vehicle 101 path 326. Further, intersection of the path 326 with a path of a moving object 305 and/or with a stationary object 310 may be computed. In general, it will be appreciated that various known mechanisms may be used in the present context to assess the opportunity to mitigate or avoid crossing target accidents with a vehicle 101, where a crossing target refers to any target that has relative lateral motion compared to the host vehicle. Further, known mechanisms may be used to detect objects 305, 310 moving vertically with respect to a vehicle 101, e.g., presenting a risk of a head-on collision.

In some implementations or modes, the HMI above could be augmented with a model of predicted ownship location along the escape path at discrete points (e.g., 0.2 seconds) into the future. For example, a simple model of progress along the escape path may be given by a fixed-point predictor model that takes current vehicle position ($X_0$), velocity ($\dot{X}$), and acceleration ($\ddot{X}$), and applies these to a short prediction span (e.g., t=0.2 seconds) to predict the position at that point in the future, e.g., $$X(t) = X_0 + t\dot{X} + \frac{t^2}{2}\ddot{X}.$$

The display might therefore provide a series of discrete predicted locations along the escape path and also the consequences of manually deviating from the planned path. This predicted location might be depicted in a number of ways ranging from simple (e.g., 'door frame', 'arrow', etc.) to complex (e.g., 'virtual car') overlaid on the escape path.

As seen in FIG. 4, a GUI 300-4 could show a projected vehicle 101 path of 326 intersecting with an object 305 and/or path of an object 305. Further, as with the exemplary GUI 300-3 of FIG. 3, a dialog box 320 could provide a vehicle 101 occupant with various options. In the example of FIG. 4, the dialog box 320 could allow a vehicle 101 occupant to ignore a proposed path 325, to accept the proposed path 325, or to assume manual control of the vehicle 101. For example, selecting "ACCEPT" could cause the computer 105 to execute, e.g., according to instructions carried out by the module 106.

Figure 5:
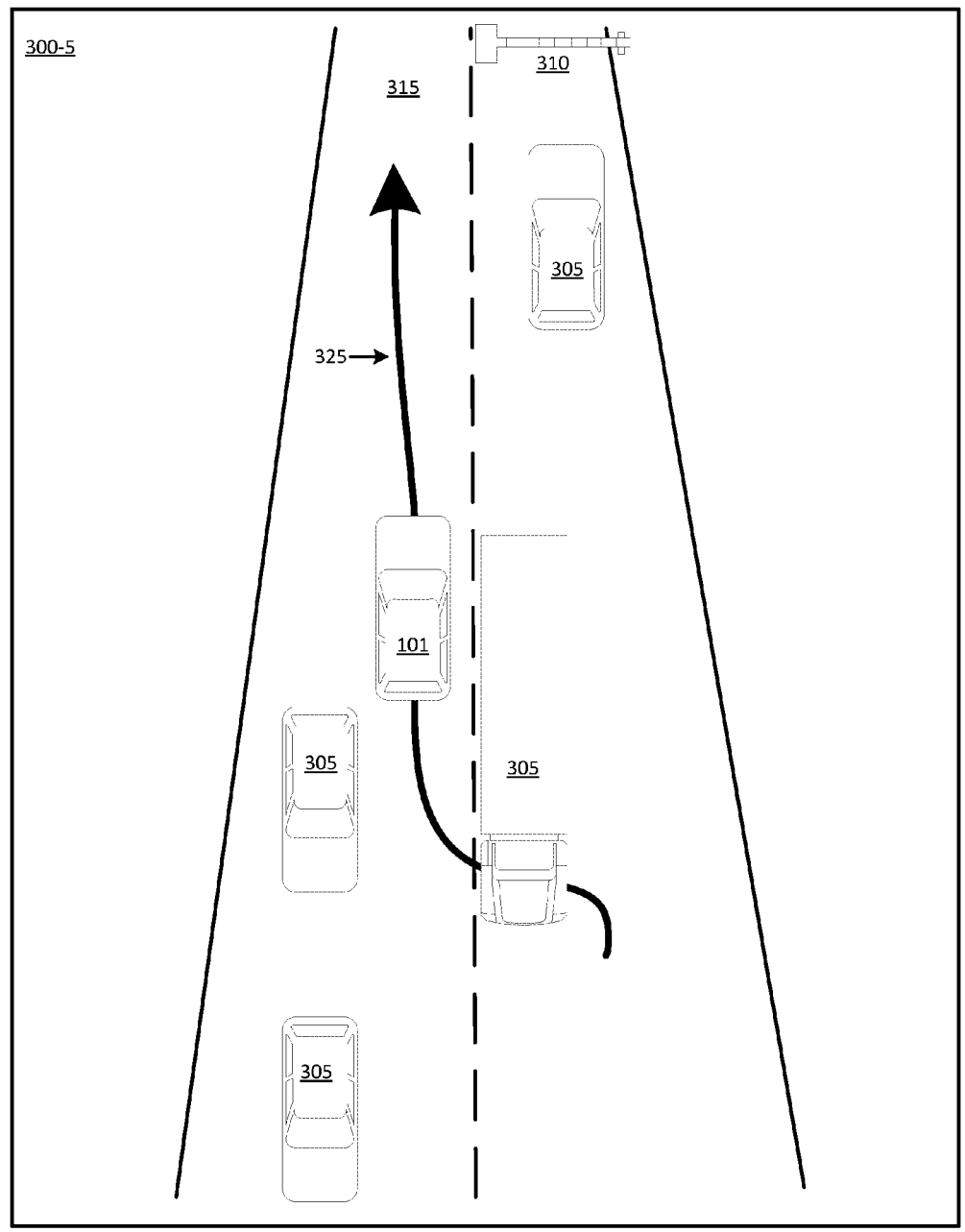

FIG. 5 illustrates the GUI 300-5 in the HMI 118 showing a vehicle 101 traversing a path 325 to avoid an object 305. For example, a proposed path 325 as shown in the GUI 300-4 could have been accepted by a vehicle 101 occupant, e.g., by input to the HMI 118, or by default. Upon such acceptance, the computer 105 could cause the module 106 to execute operations for the vehicle 101 to move along the path 325, thereby avoiding or attempting to avoid collision with an object 305.

Figure 6:
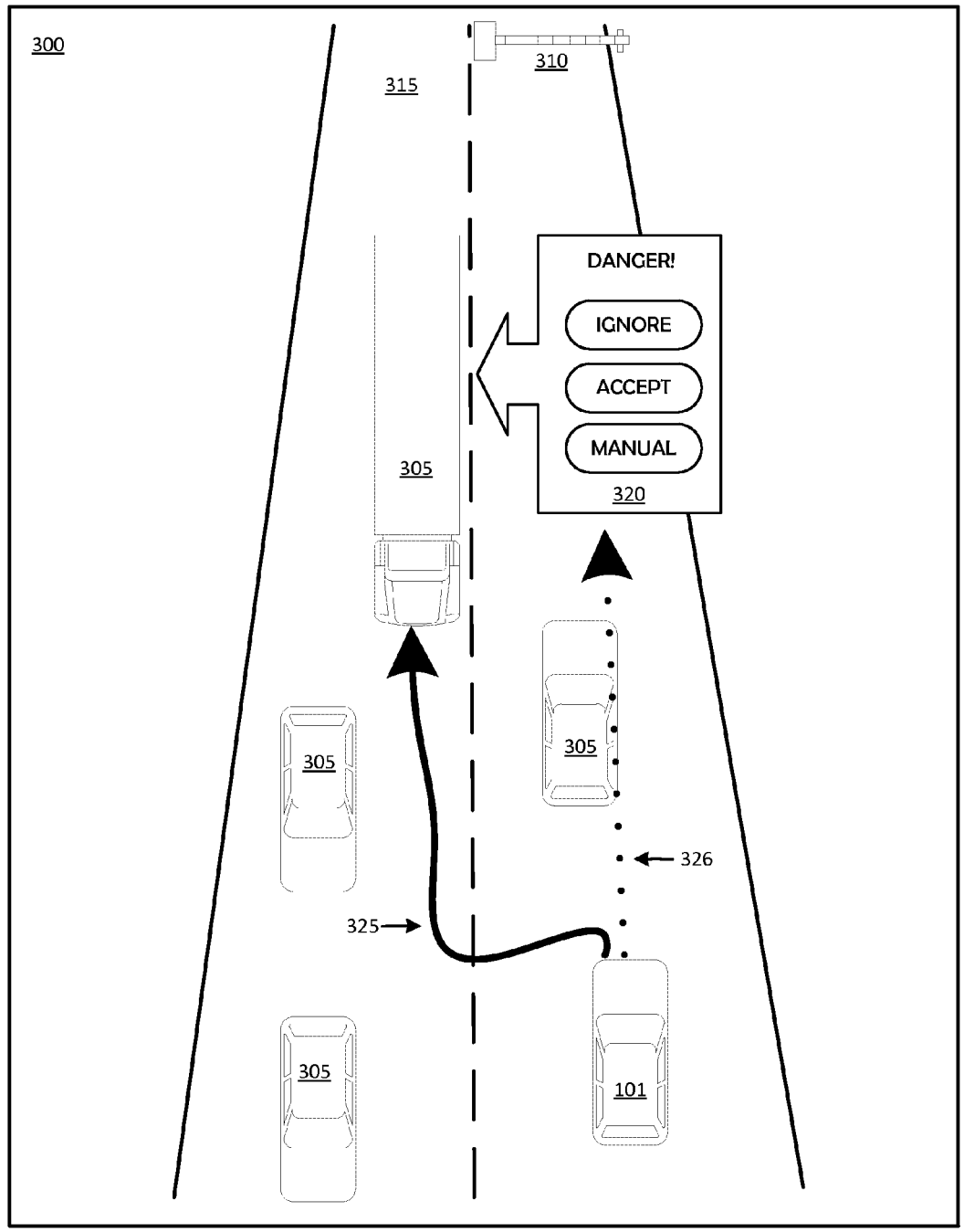

FIG. 6, similar to FIG. 4, illustrates the GUI 300-6 in the HMI 118 providing a graphical alert in the form of a dialog box 320 of an object 305 presenting a possible danger relative to a predicted travel path 325 of a vehicle 101. However, in the example of FIG. 6, a vehicle 101 occupant would see that a proposed path of 325 would likely result in a collision with an object 305, whereas an actual predicted path 326 would likely result in continued safe traversal of a road 315. Accordingly, in response to a prompt from the HMI 118, e.g., the dialog box 320, the vehicle 101 occupant could select an "IGNORE" option or the like to ignore and/or reject the proposed path 325 in favor of the predicted path 326.

Process Flow

As stated above, FIG. 2 is a diagram of an exemplary process 200, described in detail below, for a computer 105 in an autonomous vehicle 101 to communicate with one or more vehicle occupants concerning a possible future path of the vehicle 101.

The process 200 begins in a block 205, in which the vehicle 101 conducts autonomous driving operations. Thus, the vehicle 101 is operated partially or completely autonomously, i.e., a manner partially or completely controlled by the autonomous driving module 106. For example, all vehicle 101 operations, e.g., steering, braking, speed, etc., could be controlled by the module 106 in the computer 105. It is also possible that the vehicle 101 may be operated in a partially autonomous (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

Next, in a block 210, the computer 105 monitors for and/or classifies objects 305, 310 on a predicted path 326 of the vehicle 101. In general, known mechanisms, including known algorithms and the like, may be used for object classification, confidence estimation, and prediction, including path prediction.

In a block 215, following the block 210, the computer 105 determines whether the vehicle 101 is likely to collide with at least one object 305 or 310 on the path 326. For example, the computer 105 may compute the predicted and/or planned path 326 of the vehicle 101 according to collected data 115 and/or known path planning/path prediction processes. Additionally, e.g., using known mechanisms, the computer 105 may determine possible or likely collisions between one or more objects 305, 310 and the vehicle 101 according to the predicted path 326, and generate a proposed evasion path 325. For example, mechanisms are known, e.g., making use of a friction circle, for quantifying a "braking threat" or a "steering threat" of a collision. As an example, a braking threat could be quantified by determining an amount of braking, e.g., distance, needed to avoid a collision, and compared to the amount of braking possible before a collision occurs. As the ratio of these two quantities approached unity, the likelihood of avoiding a collision diminishes (and is zero when the ratio has a value of 1). Possible amounts of steering wheel torque could likewise be compared to needed amounts of steering wheel torque for evaluating the possibility of a collision. Alternatively or additionally, time to impact (TTI) calculations such as are known could be employed, wherein the computer 105 could determine a TTI and whether the TTI exceeded a threshold time at which a collision could not be avoided. If a collision threshold is met with respect to at least one object 305 or 310, then a block 220 is executed next. Otherwise, the process 200 proceeds to a block 240.

In the block 220, which may follow the block 215, the computer 105, via the HMI 118, provides an alert to a vehicle 101 occupant concerning a possible or likely collision. Alternatively or additionally, an alert or the like may be provided via a user device 150, i.e., in effect, the device 150 may operate as a computer 105 HMI 118. In any event, such alert, message, or the like may be provided via a variety of mechanisms, e.g., as shown in the GUI 300-3 or GUI 300-4, via an interactive voice response (IVR) system alone or in combination with a GUI 300, etc. Alternatively or additionally, alert information may be provided using various equipment or components included in the vehicle 101 controlled by the computer 105. For example, a possible path 325 could be shown by moving exterior vehicle 101 lights, e.g., headlights, infrared lighting, or the like, highlighting the possible path 125.

The block 225 follows the block 220. In the block 225, the computer 105 determines whether input or other indication from a vehicle 101 occupant has been received confirming an avoidance maneuver presented in an alert or the like as described with respect to the block 220. For example, a vehicle 101 occupant may use a touchscreen, voice response, etc., to indicate a selection provided in a dialog box 320. Alternatively or additionally, a vehicle 101 occupant may omit to respond to a dialog box 320, wherein, upon passage of a predetermined period of time, a default option, e.g., to evade a possible collision, to accept a proposed path 125, etc., may be selected.

A period of time before a default option is accepted may be configured according to a level of risk presented by a possible collision. For example, a speed, size, etc. of an object 305 or 310 may be taken into account; the computer 105 may be configured to wait a shorter period of time before implementing a default option in the event that an object 305 or 310 is large enough moving quickly enough, a fixed barrier, etc., of a nature to potentially cause significant damage and/or risk to the vehicle 101. The computer 105 may be configured to wait a longer period of time where an object 305 is moving slowly, an object 305 or 310 is determined to be of a size that does not threaten significant damage to the vehicle 101, etc. The computer 105 may also be configured to act differently if the object 305 is known to be another autonomous vehicle 101 as opposed to a non-autonomous vehicle.

Following the block 225, in a block 230, the computer 105, e.g., according to instructions included in the autonomous driving module 106, implements an action such as was indicated in the dialog box 320 in the block 225 to avoid one or more objects 305, 310. For example, the module 106 may implement a proposed path 325 instead of following a predicted or planned path 326.

Following the block 230, in a block 235, the computer 105 updates the HMI 118 and/or other indicators with respect to selected path 325 now being followed by the vehicle 101. For example, FIG. 5, discussed above, includes a GUI 300-5 that shows a vehicle 101 following a path 325 to avoid an object 305. Alternatively or additionally, the computer 105 may control other vehicle 101 elements, e.g., moving headlamps, infrared lights, etc., to indicate a path 325 being followed by the vehicle 101.

Following either the block 225 or the block 235, the computer 105 determines in a block 240 whether the process 200 should continue. For example, the process 200 may end if autonomous driving operations end and a driver resumes manual control, if the vehicle 101 is powered off, etc. In any case, if the process 200 should not continue, the process 200 ends following the block 240. Otherwise, the process 200 returns to the block 210.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in an autonomous vehicle, the computer comprising a processor and a memory, wherein the computer is configured to:
   operate the vehicle at least partially autonomously;
   monitor a predicted path of the vehicle to identify an object with which the vehicle is likely to collide;
   assign a threat level to the object;
   based at least in part on whether the threat level exceeds a predetermined threshold, provide a graphical user interface (GUI) that includes each of the predicted path, a proposed path for the vehicle to avoid a collision with an object, the vehicle, and a request for user input selecting a path for the vehicle to take to avoid the object;
   receive and implement a selection to follow one of the predicted path and the proposed path, wherein implementing the selection includes controlling at least one of vehicle braking, throttle, and steering to follow the selected one of the predicted path and the proposed path; and
   update the graphical user interface to include the selected one of the predicted path and the proposed path, along with a location of the vehicle on the selected one of the predicted path and the proposed path.

2. The system of claim 1, wherein the computer is configured to provide a mechanism in the graphical user interface to receive the selection.

3. The system of claim 1, wherein the computer is configured to make the selection according to a default selection.

4. The system of claim 1, wherein the computer is configured to provide information relating to at least one of the object, the proposed path, and the predicted path, via an interactive voice response (IVR) system in addition to the graphical user interface.

5. The system of claim 1, wherein the computer is configured to highlight at least one of the proposed path and the predicted path by controlling exterior lights on the vehicle.

6. The system of claim 1, wherein the computer is further configured for the selection to default to one of approving or rejecting the proposed path based in the threat level.

7. The system of claim 1, wherein the object is one of a moving object and a stationary object.

8. A method, comprising:
   operating a vehicle at least partially autonomously;
   monitoring a predicted path of the vehicle to identify an object with which the vehicle is likely to collide;
   assigning a threat level to the object;
   based at least in part on whether the threat level exceeds a predetermined threshold, providing a graphical user interface (GUI) that includes each of the predicted path, a proposed path for the vehicle to avoid a collision with an object, the vehicle, and a request for user input selecting a path for the vehicle to take to avoid the object;
   receiving and implementing a selection to follow one of the predicted path and the proposed path, wherein implementing the selection includes controlling at least one of vehicle braking, throttle, and steering to follow the selected one of the predicted path and the proposed path; and
   updating the graphical user interface to include the selected one of the predicted path and the proposed path, along with a location of the vehicle on the selected one of the predicted path and the proposed path.

9. The method of claim 8, wherein the computer is configured to provide a mechanism in the graphical user interface to receive the selection.

10. The method of claim 8, further comprising making the selection according to a default selection.

11. The method of claim 8, further comprising providing information relating to at least one of the object, the proposed path, and the predicted path, via an interactive voice response (IVR) system in addition to the graphical user interface.

12. The method of claim 8, further comprising highlighting at least one of the proposed path and the predicted path by controlling exterior lights on the vehicle.

13. The method of claim 8, wherein the selection defaults to one of approving or rejecting the proposed path based in the threat level.

14. The method of claim 8, wherein the object is one of a moving object and a stationary object.

15. A computer-readable medium tangibly embodying instructions executable by a computer processor, the instructions including instructions to:
   operate the vehicle at least partially autonomously;
   monitor a predicted path of the vehicle to identify an object with which the vehicle is likely to collide;
   assign a threat level to the object;
   based at least in part on whether the threat level exceeds a predetermined threshold, provide a graphical user interface (GUI) that includes each of the predicted path, a proposed path for the vehicle to avoid a collision with an object, the vehicle, and a request for user input selecting a path for the vehicle to take to avoid the object;
   receive and implement a selection to follow one of the predicted path and the proposed path, wherein implementing the selection includes controlling at least one of vehicle braking, throttle, and steering to follow the selected one of the predicted path and the proposed path; and
   update the graphical user interface to include the selected one of the predicted path and the proposed path, along with a location of the vehicle on the selected one of the predicted path and the proposed path.

16. The medium of claim 15, the instructions further including at least one of instructions to provide a mechanism in the graphical user interface to receive the selection and instructions to make the selection according to a default selection.

17. The medium of claim 15, the instructions further including instructions to provide information relating to at least one of the object, the proposed path, and the predicted path, via an interactive voice response (IVR) system in addition to the graphical user interface.

18. The medium of claim 15, the instructions further including instructions to highlight at least one of the proposed path and the predicted path by controlling exterior lights on the vehicle.

19. The medium of claim 15, wherein the instructions further include instructions for the selection to default to one of approving or rejecting the proposed path based in the threat level.

20. The medium of claim 15, wherein the object is one of a moving object and a stationary object.

* * * * *